(12) United States Patent
Shen et al.

(10) Patent No.: US 9,091,823 B2
(45) Date of Patent: Jul. 28, 2015

(54) OPTICAL FIBER CONNECTOR

(75) Inventors: Po-Hsun Shen, New Taipei (TW); Bing Su, Shenzhen (CN); Jun-Jin Pan, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 589 days.

(21) Appl. No.: 13/405,174

(22) Filed: Feb. 24, 2012

(65) Prior Publication Data

US 2013/0051734 A1 Feb. 28, 2013

(51) Int. Cl.
*G02B 6/36* (2006.01)
*G02B 6/38* (2006.01)

(52) U.S. Cl.
CPC ............ *G02B 6/3821* (2013.01); *G02B 6/3869* (2013.01)

(58) Field of Classification Search
None
See application file for complete search history.

(56) References Cited

U.S. PATENT DOCUMENTS 6,318,903 B1 11/2001 Andrews et al.
7,086,785 B1 * 8/2006 Bates, III ........................ 385/78

FOREIGN PATENT DOCUMENTS

| CN | 101299086 A | 11/2008 |
| CN | 101498817 A | 8/2009 |
| CN | 101939681 A | 1/2011 |

* cited by examiner

*Primary Examiner* — Tina Wong
(74) *Attorney, Agent, or Firm* — Novak Druce Connolly Bove + Quigg LLP

(57) ABSTRACT

An optical fiber connector includes a housing, a fixing member, an optical fiber ferrule fixed at an end of the fixing member, and an elastic member sleeved on an end of the fixing member. The housing includes a latching protrusion, and the fixing member includes a latching portion. The fixing member is received in the housing with the latching portion engaging with the latching protrusion, and one end of the elastic member resists on the housing and the other end of the elastic member abuts against the fixing member.

15 Claims, 3 Drawing Sheets

OPTICAL FIBER CONNECTOR

BACKGROUND

1. Technical Field

The present disclosure relates to connectors, particularly to an optical fiber connector.

2. Description of Related Art

Optical fiber connectors mechanically couple and align the cores of fibers so that light can pass through. An LC connector is a small form factor fiber optic connector. An LC connector may comprise a housing, a fixing member, an optical fiber ferrule, a spring, and a stopper. The housing axially defines a cavity at an end of the housing and an assembling hole communicating with the cavity at the other end of the housing. The housing further defines two opposite positioning grooves at the inner wall of the assembling hole. Two opposite positioning portions are formed on the outer surface of the stopper corresponding to the two position grooves. In assembly, the optical fiber ferrule is fixed at one end of the fixing member, the spring is sleeved on the fixing member, the fixing member is received in the cavity of the housing, and the stopper is assembled to the housing with the two positioning portions engaging in the two positioning grooves correspondingly. As a result, there are too many components for the LC connector hindering the efficient assembly of the LC connector, and the manufacturing cost of the LC connector is thereby increased.

Therefore, there is room for improvement in the art.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the optical fiber connector. Moreover, in the drawings, like reference numerals designate corresponding parts throughout the several views. Wherever possible, the same reference numerals are used throughout the drawings to refer to the same or like elements of an embodiment.

DETAILED DESCRIPTION

Figure 1:
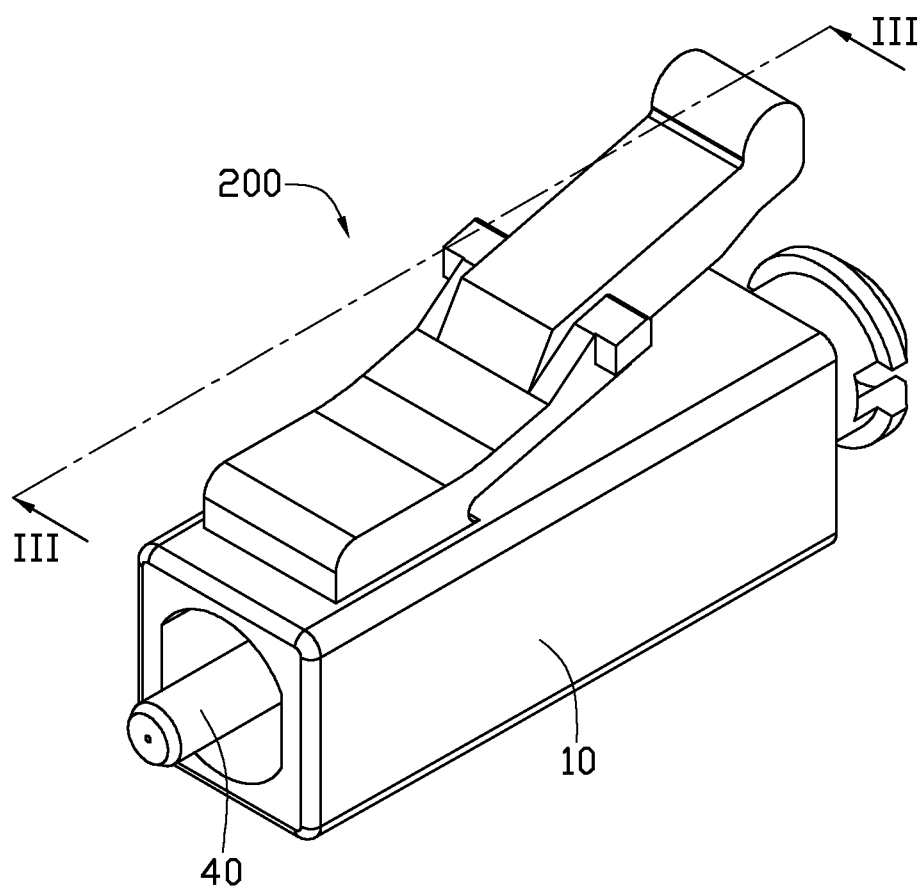
FIG. 1 is an isometric, assembled view of an embodiment of an optical fiber connector.
Figure 2:
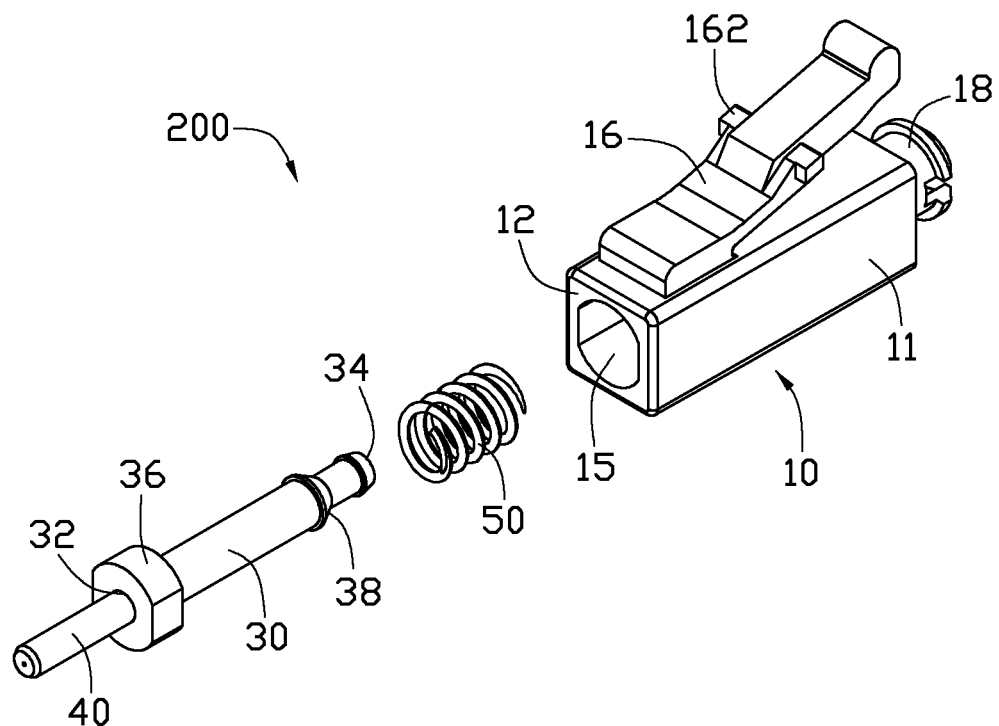
FIG. 2 is an exploded, isometric view of the optical fiber connector of FIG. 1.

Referring to FIGS. 1 and 2, an embodiment of an optical fiber connector 200 comprises a housing 10, a fixing member 30, an optical fiber ferrule 40 fixed at an end of the fixing member 30, and an elastic member 50 sleeved on the fixing member 30. The fixing member 30, the optical fiber ferrule 40 and the elastic member 50 are all received in the housing 10. In the illustrated embodiment, the optical fiber connector 200 is an LC connector.

Figure 3:
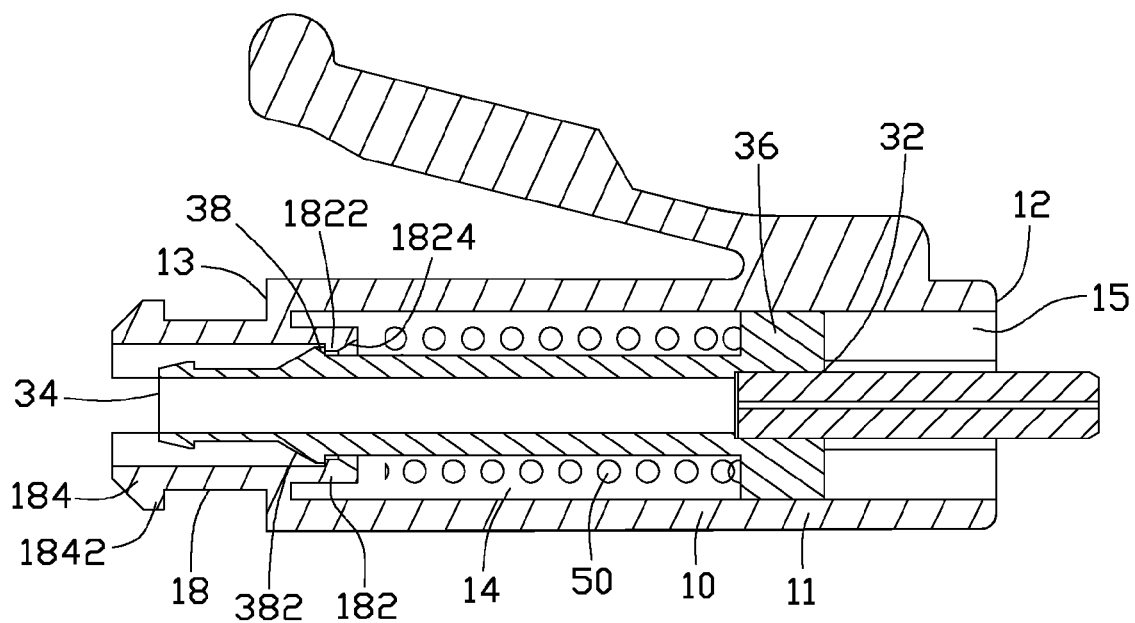
FIG. 3 is a cross-sectional view of the optical fiber connector of FIG. 1 taken along the line III-III.

Referring to FIG. 3, the housing 10, integrally formed, is a substantially hollow cylinder, and is made of plastic material. The housing 10 comprises a sleeve 11, a front end 12 and a back end 13 formed at two opposite ends of the sleeve 11. The transverse cross section of the sleeve 11 is substantially rectangular. Four side walls of the sleeve 11 cooperatively define a cavity 14 to receive the fixing member 30 and the optical fiber ferrule 40. In the illustrated embodiment, two opposite inner sidewalls of the sleeve 11 are substantially rectangular and the other two opposite inner sidewalls of the sleeve 11 are substantially arcuate. The cavity 14 defines an opening 15 at the front end 12 of the housing 10. The housing 10 further comprises a resisting member 16 formed at the outer surface of the sleeve 11 adjacent to the front end 12. The resisting member 16 forms two opposite protrusions 162 configured for engaging in a groove of an adapter (not labeled). The housing 10 further comprises a tubular member 18 communicating with the cavity 14, and the tubular member 18 is partly located within the cavity 14 at the back end 13 of the housing 10. The tubular member 18 comprises a latching end 182 received in the cavity 14 and a fixing end 184 extending out of the cavity 14 and opposite to the latching end 182. The latching end 182 comprises a latching protrusion 1822 radially extending from the inner surface of the latching end 182. The latching protrusion 1822 is annular, and the latching protrusion 1822 comprises a chamfer 1824 adjacent to the latching end 182. The chamfer 1824 is a conical surface to facilitate the insertion of the fixing member 30 into the tubular member 18, and the diameter of the conical surface of the chamfer 1824 gradually decreases from the latching end 182 to the fixing end 184. The fixing end 184 forms a latching portion 1842 at the outer surface of the fixing end 184. The latching portion 1842 is used to fix a protective sleeve for a cable (not labeled).

The fixing member 30 is substantially cylindrical. The fixing member 30 axially defines a first inserting hole 32 at one end of the fixing member 30 and a second inserting hole 34 communicating with the first inserting hole 32 at the other end of the fixing member 30. The first inserting hole 32 is used to fix the optical fiber ferrule 40 and the second inserting hole 34 is used for inserting an optical fiber into the fixing member 30 to align with the optical fiber ferrule 40. The fixing member 30 further comprises a shoulder 36 formed at the outer surface of the fixing member 30 adjacent to the first inserting hole 32, and a latching portion 38 formed at the outer surface of the fixing member 30 away from the shoulder 36 to latch the latching protrusion 1822. In the illustrated embodiment, the shape of the shoulder 36 corresponds to the shape of the cavity 14 in order to fix the fixing member 30 in the cavity 14 without rotating. In other words, the fixing member 30 is non-rotatably fixed in the cavity 14 of the housing 10. The latching portion 38 is annular and forms a chamfer 382 away from the shoulder 36 to facilitate the insertion of the fixing member 30 into the tubular member 18. In the illustrated embodiment, the chamfer 382 is a conical surface, and the diameter of the conical surface of the chamfer 382 gradually decreases from the first inserting hole 32 to the second inserting hole 34. In alternative embodiments, the chamfer 382 is omitted.

In alternative embodiments, the cavity 14 can be elliptical, or of a non-circular shape with at least one inner sidewall being flat to avoid rotating of the fixing member 30 received in the cavity 14.

The elastic member 50 is sleeved on the fixing member 30. In the illustrated embodiment, the elastic member 50 is a coil spring.

In assembly, the optical fiber ferrule 40 is fixed in the first inserting hole 32 of the fixing member 30, the elastic member 50 is sleeved on an end of the fixing member 30 away from the optical fiber ferrule 40. An end of the fixing member 30 with the latching portion 38 is inserted into the housing 10 through the opening 15 with the outer surface of the shoulder 36 abutting the inner surface of the cavity 14. The fixing member 30 is pushed towards the tubular member 18 until the chamfer 382 of the latching portion 38 of the fixing member 30 fully engages with the chamfer 1824 of the latching protrusion 1822 of the tubular member 18. The latching portion 38 slides along the chamfer 1824 until the latching portion 38 and the latching protrusion 1822 are engaged with each other. At this time, one end of the elastic member 50 abuts against the latching end 182 of the tubular member 18 and the other end of the elastic member 50 rests against the shoulder 36 of the fixing member 30. The fixing member 30 with the optical fiber ferrule 40 is thus firmly fixed in the housing 10.

In summary, the latching protrusion 1822 of the housing 10 engages with the latching portion 38 of the fixing member 30 to firmly fix the fixing member 30 in the housing 10. The total number of components of the optical fiber connector 200 is reduced. As a result, the assembling efficiency for the optical fiber connector 200 is improved and the manufacturing cost of the optical fiber connector 200 is decreased. Since at least one inner sidewall of the cavity 14 is flat, the cavity 14 thus acts to prevent the rotation of the fixing member 30 received in the cavity 14.

The present embodiments and their advantages will be understood from the foregoing description, and it will be apparent that various changes may be made thereto without departing from the spirit and scope of the embodiments or sacrificing all of its material advantages.

What is claimed is:

1. An optical fiber connector, comprising:
   a housing comprising a sleeve and a tubular member, the sleeve defining a cavity, the tubular member communicating with the cavity and partly located within the cavity, the tubular member comprising a latching end received in the cavity and a fixing end extending out of the cavity and opposite to the latching end, the latching end comprising a latching protrusion being annular and radially extending from an inner surface of the latching end, the latching protrusion comprising a chamfer, the chamfer being a conical surface, and the diameter of the conical surface of the chamfer gradually decreasing from the latching end to the fixing end;
   a fixing member comprising a latching portion corresponding to the latching protrusion;
   an optical fiber ferrule fixed at an end of the fixing member; and
   an elastic member sleeved on an end of the fixing member, wherein the fixing member is received in the cavity with the latching portion engaging with the latching protrusion, and one end of the elastic member resisting with the latching end and the other end of the elastic member resting against the fixing member.

2. The optical fiber connector of claim 1, wherein the housing further comprises a front end and a back end formed at opposite ends of the sleeve, the tubular member is partly located within the cavity at the back end, and a plurality of side walls of the sleeve cooperatively define the cavity to receive the fixing member and the optical fiber ferrule.

3. The optical fiber connector of claim 2, wherein the cavity defines an opening at the front end of the housing.

4. The optical fiber connector of claim 2, wherein the number of the side walls is four, two opposite inner sidewalls of the sleeve are substantially rectangular and the other two opposite inner sidewalls of the sleeve are substantially arcuate.

5. The optical fiber connector of claim 2, wherein the housing further comprises a resisting member formed at an outer surface of the sleeve adjacent to the front end.

6. The optical fiber connector of claim 5, wherein the resisting member forms two opposite protrusions.

7. The optical fiber connector of claim 1, wherein the chamfer is adjacent to the latching end.

8. The optical fiber connector of claim 1, wherein the fixing member is substantially cylindrical, the fixing member axially defines a first inserting hole at one end of the fixing member and a second inserting hole communicating with the first inserting hole at the other end of the fixing member, and the optical fiber ferrule is fixed in the first inserting hole.

9. The optical fiber connector of claim 8, wherein the fixing member comprises a shoulder formed at the outer surface of the fixing member adjacent to the first inserting hole and the latching portion formed at the outer surface of the fixing member away from the shoulder.

10. The optical fiber connector of claim 9, wherein the latching portion is annular, and the latching portion comprises a chamfer away from the shoulder to facilitate the insertion of the fixing member into the tubular member.

11. The optical fiber connector of claim 10, wherein the chamfer of the latching portion is a conical surface, and the diameter of the conical surface of the latching portion gradually decreases from the first inserting hole to the second inserting hole.

12. The optical fiber connector of claim 9, wherein the cavity is of a non-circular shape with at least one inner sidewall being flat, and the shape of the shoulder corresponds to the shape of the cavity in order to fix the fixing member in the cavity without rotating.

13. The optical fiber connector of claim 9, wherein the cavity is elliptical, and the shape of the shoulder corresponds to the shape of the cavity in order to fix the fixing member in the cavity without rotating.

14. The optical fiber connector of claim 9, wherein one end of the elastic member abuts against the latching end of the tubular member and the other end of the elastic member rests against the shoulder of the fixing member.

15. The optical fiber connector of claim 14, wherein the elastic member is a coil spring.

\* \* \* \* \*